Figure 1:
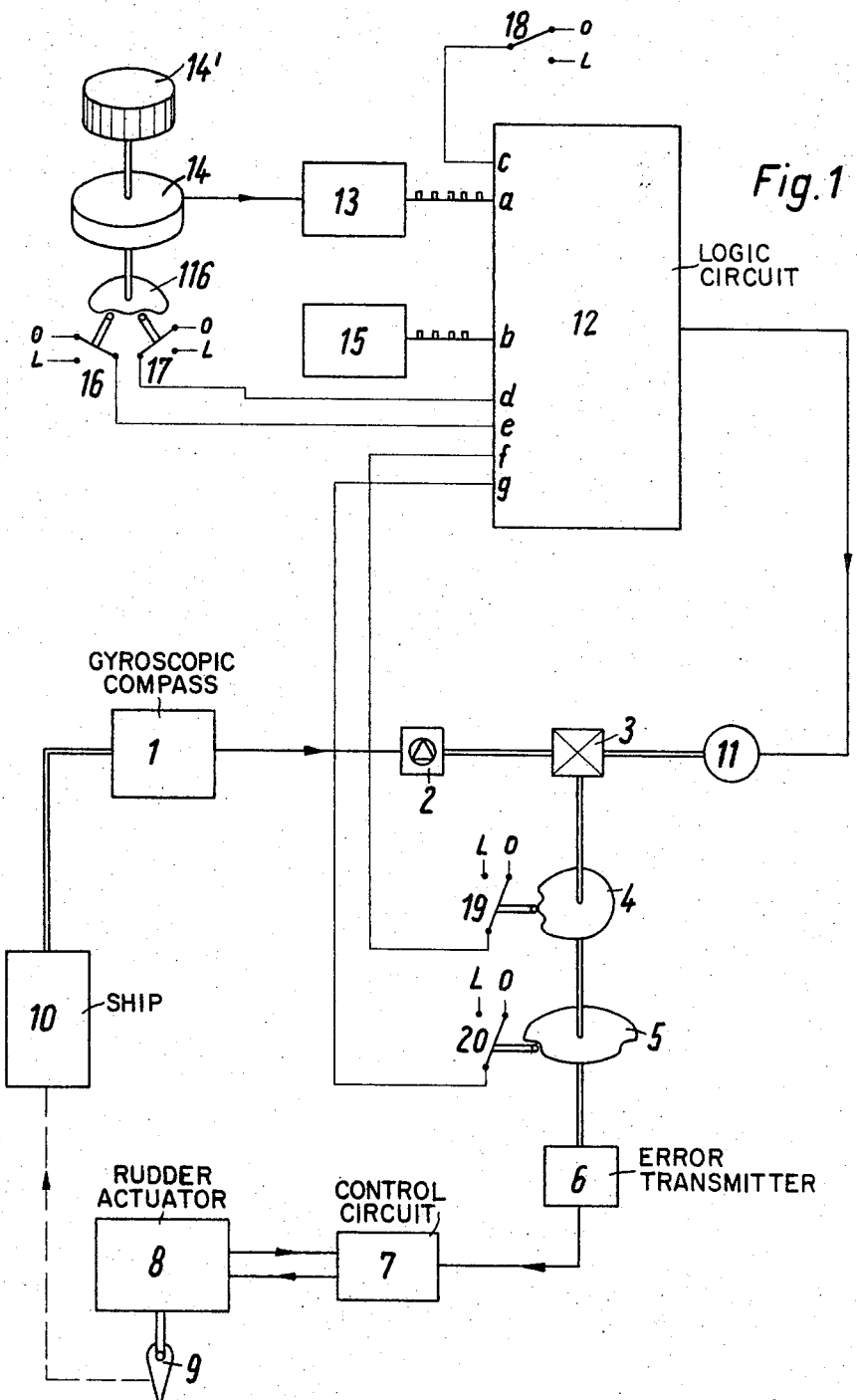

ated by electrical impulses of adjustable frequency.

United States Patent
Kundler et al.

[15] 3,699,420
[45] Oct. 17, 1972

[54] AUTOMATIC CONTROL SYSTEM CONTROLLING THE COURSE OF A SHIP

[72] Inventors: Walter Kundler, 157, Schilkseer Strasse, Kiel; Gerd Hingst, 20, Rohbarg, Kiel-Ellerbek, both of Germany

[22] Filed: Oct. 19, 1970

[21] Appl. No.: 81,975

[30] Foreign Application Priority Data

Oct. 22, 1969 Germany..........P 19 53 198.7

[52] U.S. Cl.................................318/588, 114/144
[51] Int. Cl................................................G05d 1/08
[58] Field of Search ..318/588, 580; 244/77; 114/144

[56] References Cited

UNITED STATES PATENTS 2,841,754  7/1958  Jones..........................318/588
3,517,285  6/1970  Kundler......................318/588

Primary Examiner—Benjamin Dobeck
Attorney—Shlesinger, Fitzsimmons & Schlesinger

[57] ABSTRACT

The novel automatic control system or automatic pilot controls the course of a ship by means of
1. a gyroscopic indicator for indicating the course or true heading of the ship,
2. a reference value transmitter adjustable in accordance with the desired course angle of the ship,
3. summing means for detecting any positional disagreement of said indicator with said reference value transmitter, such disagreement representing the course error and
4. means causing the course error to control a motor-operable rudder actuator which so actuates the rudder of the ship as to reduce the course error to a minimum. For the purpose of steering the ship along a curved track, as on a winding river, means are provided for driving the reference value transmitter to change the desired course set up therein in the clockwise sense or in the anti-clockwise sense at an adjustable rate. The drive may be effected by a stepping motor actuated by electrical impulses of adjustable frequency.

10 Claims, 3 Drawing Figures

AUTOMATIC CONTROL SYSTEM CONTROLLING THE COURSE OF A SHIP

Our invention relates to an automatic control system controlling the course of a ship or an automatic pilot and, more particularly, to a reference value transmitter which is included in the novel control system and is adjustable in accordance with the desired heading or course angle of the ship.

The trend towards automation has led to an increased use of automatic pilots for ships. These serve the purpose of directing ships, with the accuracy obtainable under prevailing conditions, into a selected target area without requiring the continuous attention of a helmsman for keeping the ship on a stable course. In the case of sea-going ships, the desired course to be steered during navigation is prescribed to the automatic pilot and is set up on a reference value transmitter. The entire route of the ship is composed of a plurality of tracks, each having a constant course angle. The above method of course control is not suitable for river ships because the course would have to be altered very frequently for rivers with many bends and curves. It is, therefore, advantageous to prescribe to the automatic pilot of river ships not the course angle itself, but the rate at which the course angle is to be changed and the direction of such change.

It is known to achieve this by means of a course controller which uses the output signal of a rate gyroscope as reference value. This has the disadvantage of the rate gyroscope not only measuring the angular velocity of the ship about its vertical axis with regard to the meridian, but also that component of the angular velocity of the rotation of the earth which coincides with the vertical axis of the ship. This results in an error depending on the geographical latitude. A further disadvantage consists in that it is not possible for the ship to move forwards in a straight line because of the limited solution which any rate gyroscope has and which can be approximated very closely only by using very expensive rate gyroscopes.

It is an object of the invention to avoid this disadvantage by the provision of an automatic pilot which will steer the ship with high accuracy along a curved track of a predetermined radius of curvature.

It is a further object of the present invention to so modify an automatic control system controlling the course of a ship by means of a gyroscopic compass that the desired course set up on a reference value transmitter forming part of the system will change at an adjustable rate optionally in the clockwise direction or in the anti-clockwise direction. Finally, it is an object of the present invention to provide a reference value transmitter of the kind just explained which is simple in design and reliable in operation.

Our invention will now be explained with reference to preferred embodiments thereof diagrammatically indicated on the accompanying drawings. It is to be understood, however, that our invention is in no way restricted or limited to the details of such embodiments but is capable of numerous modifications within the scope of the appended claims.

In the drawings

Figure 2:
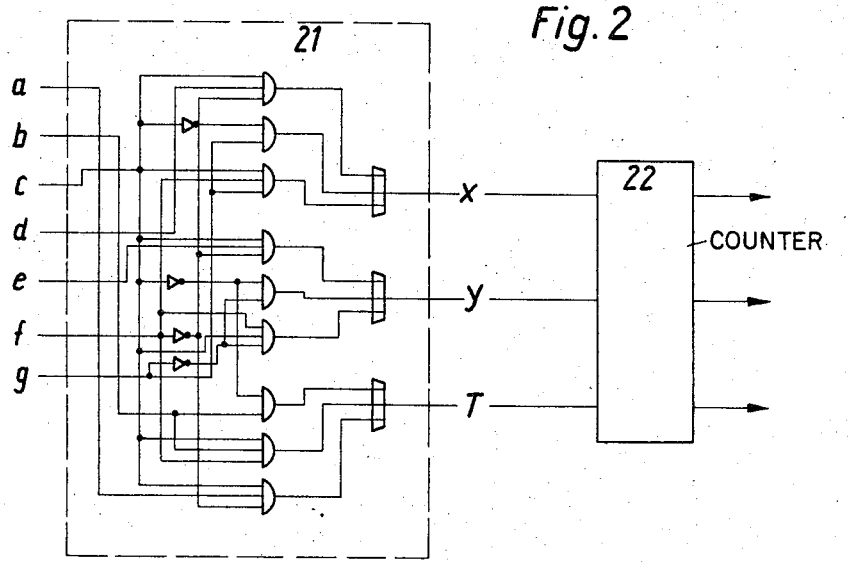
Figure 3:
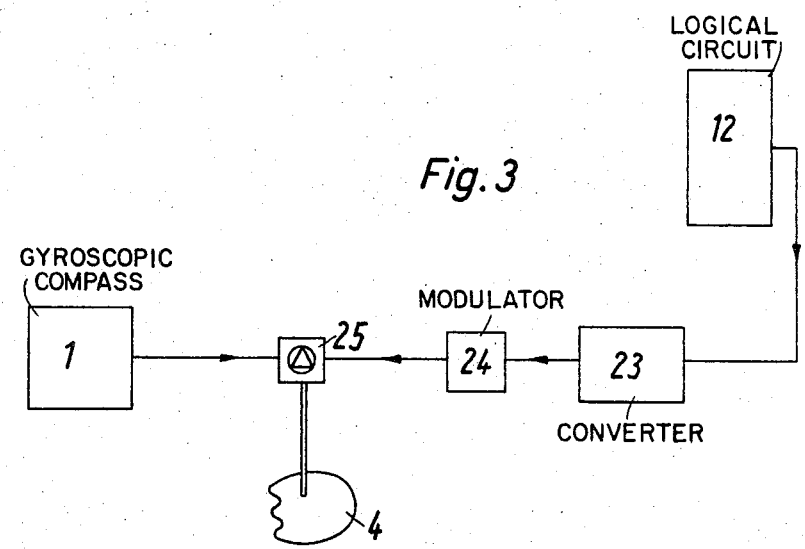

FIG. 1 is a block diagram showing an automatic control system controlling the course of a ship and including an automatic pilot, a gyroscopic compass and our novel reference value transmitter automatically set up in accordance with the desired course of the ship, FIG. 2 is a circuit diagram of a logical circuit represented by block 12 in FIG. 1 and FIG. 3 is a modified portion of FIG. 1 indicating an alternative design of the summing means which detect positional disagreement of the gyroscopic compass with the novel reference value transmitter.

The automatic control system shown in FIG. 1 which controls the course of the ship includes an automatic pilot which comprises a course error transmitter 6 controlled by a gyroscopic indicator such as a gyroscopic compass 1 indicating the true heading of the ship and by a reference course indicator adjustable in accordance with the desired course of the ship, and a control circuit 7. The course error transmitter is adjusted by the gyroscopic compass 1 and by the reference value transmitter in accordance with the positional disagreement of both representing the course error. The automatic pilot in its turn controls a motor-operable rudder actuator 8 actuating the rudder 9 of the ship. The control loop of the system is composed of the automatic pilot 6, 7, the rudder actuator 8, the rudder 9, the ship 10 itself which responds in accordance with its steering properties to changes of the rudder angle, the gyroscopic indicator 1 and the summing means 3 in FIG. 1 or 25 in FIG. 3 which detect the course error and set up the course error transmitter 6 accordingly.

An automatic pilot for ships of this kind is well known in the art and shown and described for instance in U.S. Pat. No. 3,517,285 of June 23, 1970. Therefore, a detailed description of the automatic pilot and, more particularly, of the electrical circuit 7 and of the course error transmitter 6 may be dispensed with herein.

The summing means 3 may be constituted by a differential transmission having a first input geared to a synchro-receiver 2 connected to the gyroscopic indicator 1 to indicate the measured heading of the ship, a second input geared to the reference value transmitter composed of the elements 11 – 18 to be described hereinafter, and an output geared to the course error transmitter 6 to set the same in accordance with the positional disagreement of the reference value transmitter with the synchro-receiver 2, such disagreement constituting the course error. This control loop controls the course angle of the ship to a value, preset by the reference value transmitter 11 – 18.

This reference value transmitter is formed in the embodiment of the invention shown in FIG. 1 by a motor moving in steps. The motor is rotated by a sequence of electrical impulses having a frequency $f$. These are produced by impulse producing means including an impulse generator 13 and passed on via a logical circuit 12 to the motor. The frequency $f$ and the direction of rotation of the motor are controlled by the logical circuit 12 in response to setting means in form of a hand-operated element 14' for maneuvering the ship and to the operative condition of the control loop. The inputs of the circuit 12 are connected as follows:

a selector switch 18 connected to the input $c$ and effecting the change-over of rudder control from manual control to control by the automatic pilot, directional switches 16, 17 connected to the inputs $d$ and $e$ respectively, for effecting any change of direction, dictated by changes in direction of the course set by the setting means 14', a limit switch 19, connected to the input $f$ and responsive to the course error exceeding a predetermined limit, a switch 20, connected to the input $g$ and responsive to changes in sign of the course error and the above-mentioned frequency generator 13 and a second constant frequency impulse generator 15 for a purpose to be specified below, the generators constituting the impulse producing means being connected to the inputs $a$ and $b$ respectively.

The conditions for the operation of the logical circuit are therefore dependent on the position of the switches or switch contacts 16 – 20. Each of these contacts sets the corresponding condition to the logical value L or 0.

The hand-operated element 14' for maneuvering consists in the case of the embodiment shown of a rotatable knob whose shaft carries a potentiometer 14, determining the frequency of the impulse generator 13, and a cam 116. The cam has such a shape that, according to the direction of rotation of the knob 14' starting from a zero position, switch 16 or switch 17 is reversed from 0 to L. In the "zero" position both switches are at 0. The input shaft of the course error transmitter 6 carriers two cams 4 and 5. The cam 4 has such a shape that it moves the limit switch 19 to the position L when the desired course changes at a rate which exceeds the maximum possible turning speed of the ship. Thus, the switch is at O only so long as the ship can follow the preset turning rate. The cam 5 moves the switch 20 from the position 0 to the position L, when the course error passes through zero and in doing so changes its sign.

In the following, the various conditions for the operation of the logical circuit 12 are designated by the same letters as the inputs of this circuit into which current is fed under the respective conditions. The conditions $c$ to $g$ have then the following meanings:

Condition $c$ indicates whether the control selector switch 18 is on "Manual" or on "Automatic". In the "Manual" position, the helmsman steers the ship in the conventional manner by means of the motor-operable rudder actuator 8. In the "Automatic" position the equipment according to the invention is rendered operative. The conditions $d$ and $e$ indicate the direction of the given angular velocity of the change of course. This means in other words, that, when current is applied to the input $d$ only, the stepping motor 11 rotates in such a direction as to change the desired course in the anti-clockwise sense, i.e., towards port. If current is applied, however, to the input $e$ only, then the course is changed in the clockwise direction, i.e., towards starboard. If the ship is to move along a straight track, $d$ and $e$ will be equal to O.

Condition $f$ indicates whether the output signal of the course error transmitter 6 exceeds limits which are predetermined by the shape of the cam 4.

Condition $g$ indicates the sign of the course error.

The logical circuit 12 has the effect that, when $f = 0$, the number of revolutions of the step-by-step motor is proportional to the frequency of the impulses produced by the generator 13, and that the direction of rotation of the motor shaft corresponds to condition $d$ or $e$. The condition $f = 0$ is fulfilled as long as the ship can follow the turning rate prescribed by the reference value transmitter. If this turning rate exceeds that which can be reached by the ship, the cam 4 causes $f$ to be equal to L. If the motor 11 would keep on rotating with an excessive speed, the measuring range of the course error transmitter 6 would then be finally exceeded or the reference course be lost because of the shaft of the course error transmitter having performed a whole revolution. For this reason the step-by-step motor is turned back with the aid of the conditions $f$ and $g$ at a fixed rotary speed which corresponds to the frequency of the impulse $b$ of the frequency generator 15 until the condition $f = 0$ is fulfilled. Thereupon the switch 19 is reversed to 0 which has the result of reconnecting the step-by-step motor 11 to the impulse generator 13. The value of condition $f$ changes therein the more frequently, the greater the difference is between the prescribed rate of the change of course and the angular velocity attained by the ship. This condition can also be indicated to the crew by means of an acoustic signaller.

When the ship is steered by hand and the switch 18 consequently reversed to the 0 position, it is necessary for the output signal of the course error transmitter 6 to be kept at zero. Only when this condition is fulfilled, the momentary course is taken over after the switch 18 has been moved into position L. This condition is fulfilled by the logical circuit 12, if $c = 0$. The condition $g$ serves therein for indicating that the course error is zero. The step-by-step motor 11 of the reference value transmitter is driven by the impulses from the generator 15 and with the aid of condition $g$ so that the cam shaft 5 keeps moving towards the switch point, which is reached when the output signal of the course error transmitter 6 becomes 0. Every change of the actual course transmitted by the synchronous receiver 2 and arising during maneuvering by manual steering, is thus compensated by the step-by-step motor 11.

The logical circuit 12 may be laid out in many different ways. This follows from the laws of the logical synthesis (e.g. de Morgan principle). The logic switch gear contains a forward and backward counter 22 whose output end is adapted to the output end of the step-by-step motor.

The counter receives the following input signals:

$X$ = forward counting
$Y$ = backward counting
$T$ = counting beat.

Furthermore, the logical circuit contains a gate network 21 which ties the quantities $X$, $Y$ and $T$ to the quantities $a$ to $g$ in accordance with the following logic equations.

$$X = c \cdot d \cdot f' + c' \cdot g + c \cdot f \cdot g$$
$$Y = c \cdot e \cdot f' + c' \cdot 9' + c \cdot f 9' + C \cdot f \cdot g'$$
$$T = c' \cdot b + c \cdot b \cdot f + c \cdot a \cdot f'$$

The embodiment described can be varied in many respects. For instance, the mechanically reversible switches shown in FIG. 1, set for the different conditions to be impressed on the logical circuit may be replaced by electronic switches built-up from transistors. Furthermore, the motor 11 of the reference value transmitter and the summing means 3 may be replaced by a differential synchro 25 with two inputs of which one can be set by the gyroscopic compass to the actual course and of which the other can be adjusted in steps by the impulses supplied from the logical circuit 12 by means of a digital analogous converter 23 to a modulator 24, whilst the output controls the course controller 7. This is shown in FIG. 3. The output signals of the logical circuit 12 are transposed in the digital analogous converter into analogous signal which are prepared in the modulator 24 for being dealt with in the differential synchro 25.

There is further the possibility of dispensing with the impulse generator 15. This is possible if the conditions $f$ and $c$ influence the impulse generator 13 through a suitable logic gate-tie in such a manner that the generator is switched over to a high constant frequency.

The automatic pilot 6, 7 has not been described in detail as it does not form part of our invention. It may be mentioned, however, that the arrow leading from the motor-operable rudder actuator 8 to the control circuit 7 of the automatic pilot indicates means for feeding a signal representing the rudder angle back to the circuit 7. As such means are well known and have been described in the above-mentioned U.S. patent, for instance, a detailed description thereof is deemed dispensable herewith.

While we have explained our invention by reference to detailed embodiments thereof, we wish it to be understood that our invention is in no way restricted or limited to such details but is capable of numerous modifications within the scope of the appended claims. Moreover, it will be understood from the above description that our invention attains all of the objects stated hereinabove and, therefore, amounts to a valuable contribution to the art.

What we claim is:

1. In an automatic pilot for ships of the type in which the control loop is formed by a motor-operable rudder actuator, the rudder of the ship, the ship itself responding to the rudder actuation in accordance with its steering properties, a gyroscopic device installed on the ship and measuring the true heading or course angle of the ship, a reference value transmitter settable to the desired course angle, summing means connected with said gyroscopic device and with said reference value transmitter for detecting the positional disagreement thereof which indicates the course error, and a control circuit connected with said summing means to be fed with said course error and connected with said rudder actuator for controlling the actuation thereof, the combination comprising driving means included in said reference value transmitter for changing the transmitted reference value, which is the desired course angle of the ship, at a certain rate and in a certain direction, and setting means connected with said driving means for changing said certain rate and said direction.

2. The combination claimed in claim 1 in which said driving means is stepwise operable at a certain frequency, said setting means determining said frequency.

3. The combination claimed in claim 2 further including a logical circuit connected with said setting means and said driving means for controlling said frequency and said direction in dependence on the adjustment of said setting means and on the operative condition of said control loop.

4. The combination claimed in claim 1 in which said driving means include a step-by-step moving motor.

5. An automatic control system controlling the course of a ship comprising a control circuit, a motor-operable rudder actuator connected with said circuit to be controlled thereby, means for feeding a signal representing the rudder angle back to said circuit, a gyroscopic indicator installed on the ship to measure the true heading of the ship, a synchro-receiver connected to said gyroscopic indicator to indicate the measured heading of the ship, a reference value transmitter adjustable in accordance with the desired course angle of the ship, a differential transmission having two inputs one of which is geared to said synchro-receiver and the other one of which is geared to said reference value transmitter, a course error transmitter for transmitting a course error signal connected with said control circuit, said differential transmission having an output geared to said course error transmitter to set the same in accordance with the positional disagreement of said reference value transmitter with said synchro-receiver, such disagreement constituting the course error, said reference value transmitter including driving means for changing the transmitted reference value, which is the desired course angle of the ship, at a certain rate and in a certain direction, and setting means connected with said driving means for changing said certain rate and said direction.

6. An automatic control system controlling the course of a ship comprising a control circuit, a motor-operable rudder actuator connected with said circuit to be controlled thereby, means for feeding a signal representing the rudder angle back to said circuit, a gyroscopic indicator installed on the ship to indicate the true heading the ship, a synchro-receiver connected to said gyroscopic indicator to be set up in accordance with the true heading of the ship, a course error transmitter connected with said control circuit to feed the same with a course error signal, and connecting means connecting said course error transmitter with both said synchro-receiver and said reference value transmitter to detect the positional disagreement of the latter with said synchro-receiver and to set the latter in accordance with the course error, an impulse generator, setting means connected with said impulse generator to determine the frequency of the impulses generated thereby, said connecting means comprising a differential synchro having a first input, a second input and an output, said first input being connected to said synchro-receiver to be set up in accordance with the true heading of the ship, said second input being connected with said impulse generator to be stepwise rotated thereby, a digital analogous converter and a modulator being inserted between said second input and said impulse generator, and means for connecting the output of said differential synchro with said course error transmitter.

7. The combination claimed in claim 3 in which said driving means comprises impulse producing means for optionally producing either impulses with a fixed frequency or, alternatively, impulses with an adjustable frequency, and a step-by-step moving motor connected with said impulse producing means to be rotated stepwise by said impulses, said logical circuit controlling said impulse producing means to determine which kind of impulses are produced thereby, said setting means being connected to said impulse producing means to control the frequency of said impulses.

8. The combination claimed in claim 7 in which said impulse producing means comprises two impulse generators one of which is connected with said setting means for control of the frequency of the impulses produced and the other one of which produces impulses of fixed frequency, said generators being selectively connected with said step-by-step moving by said logical circuit, the latter including means for determining the direction of rotation of said motor.

9. The combination claimed in claim 7 further comprising a counter (22) connected with said logical circuit for counting the forward runs and the rearward runs of said motor, said logical circuit including AND-gates.

10. The combination claimed in claim 3 further comprising a. a selector switch connected with said logical circuit for optionally disabling the automatic pilot for manual control of said motor-operable rudder actuator, b. directional switches connected with said logical circuit and with said switching means to be selectively operable by said setting means in dependence on the direction of operation of said setting means, c. a limit switch operable by said summing means to be responsive to an increase of said course error beyond predetermined limits, and d. A switch operable by said summing means to be responsive to a change of sign of said course error.

* * * * *